June 13, 1950 T. A. MILHOLLAND 2,511,648
MINNOW BUCKET
Filed Jan. 20, 1948 2 Sheets-Sheet 1
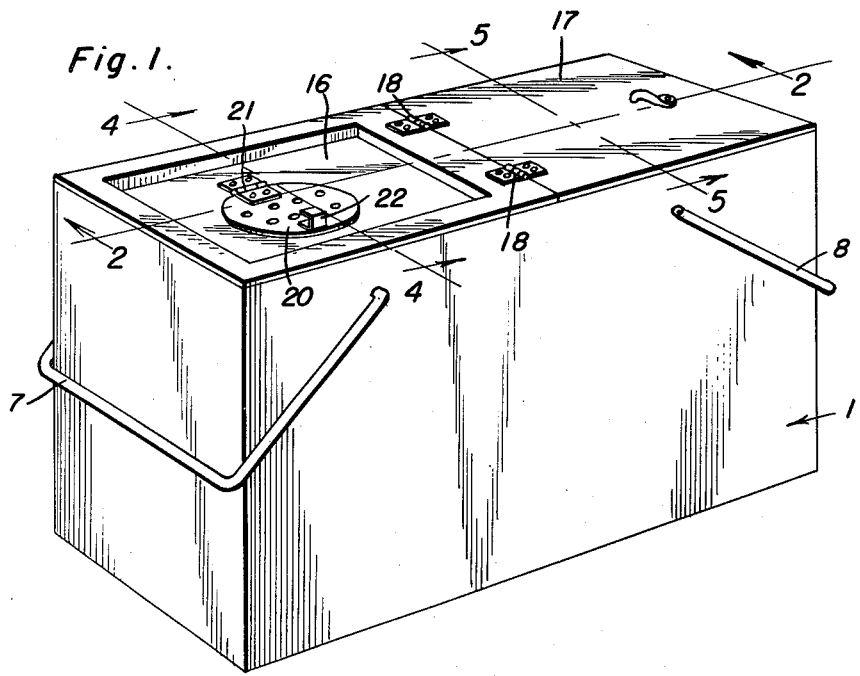
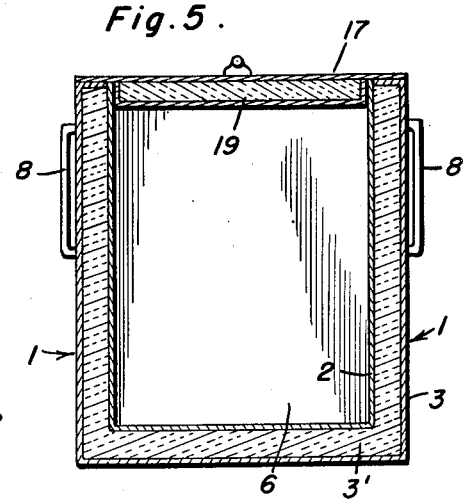
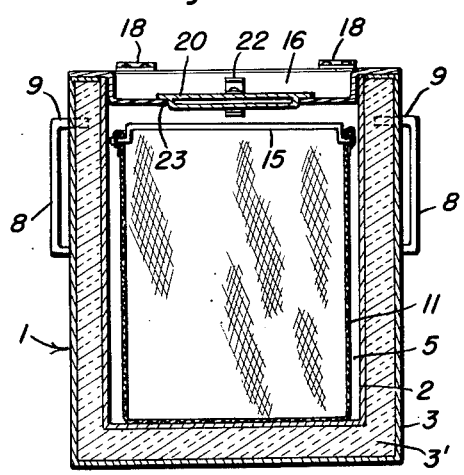
Texas A. Milholland
INVENTOR.

June 13, 1950     T. A. MILHOLLAND     2,511,648
MINNOW BUCKET
Filed Jan. 20, 1948     2 Sheets-Sheet 2
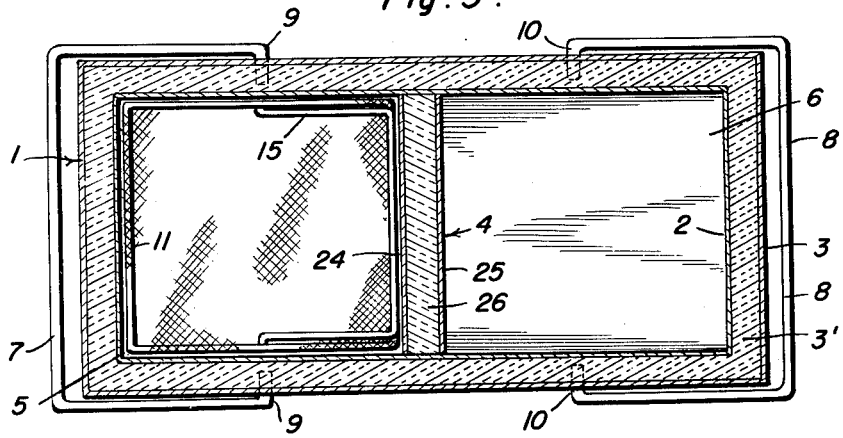
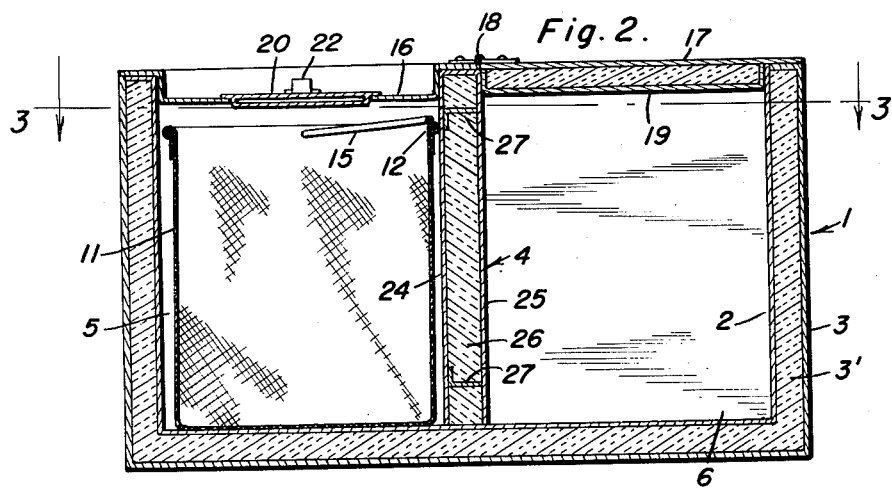
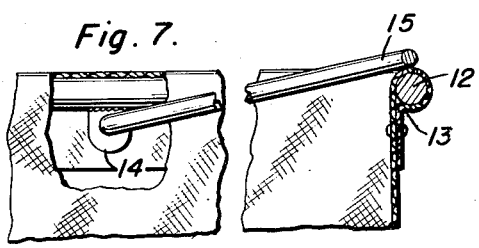
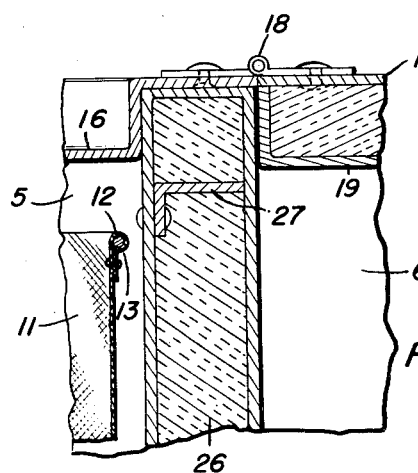
Texas A. Milholland
INVENTOR.

Patented June 13, 1950

2,511,648

UNITED STATES PATENT OFFICE 2,511,648

MINNOW BUCKET

Texas A. Milholland, Little Rock, Ark.

Application January 20, 1948, Serial No. 3,344

2 Claims. (Cl. 62—85)

My invention relates to improvements in minnow buckets for keeping minnows alive for fishing bait.

By way of explanation, it is well-known that minnows will die in a comparatively short time if placed in a small container of water because the small quantity of water contained will not absorb oxygen as rapidly as it is used up by the minnows, whereas, reducing the temperature of the water to a low point, approximately 50° F. will result in absorption by the same of oxygen sufficient to maintain minnows therein alive for a comparatively long time. However, a too rapid reduction in the temperature of the water to such a low point will cause minnows to die from shock, while, if the temperature is reduced to such a low point too slowly, the minnows are liable to die from insufficient oxygen being absorbed by the water during such a slow period of cooling.

Having the foregoing in mind, it is the primary object of my invention to provide a minnow bucket with a container for the minnows, and means for reducing the temperature of the water to a sufficiently low point to absorb oxygen for keeping the minnows alive, the temperature reduction, or cooling, being accomplished in a manner to obviate too rapid, or too slow, cooling, and the bucket being adapted for maintaining the low temperature for any desired period of time to maintain the minnows alive indefinitely.

Another object is to provide a bucket of the character and for the purpose above set forth which is easy to handle, simple in construction, durable, and comparatively inexpensive to manufacture.

Other and subordinate objects within the purview of my invention, together with the precise nature of my improvements will be readily understood when the succeeding description and claims are read with reference to the drawings, accompanying and forming part of this specification.

In said drawings:

Figure 1 is a view in perspective of my improved minnow bucket in a preferred embodiment thereof;

Figure 2 is a view in vertical longitudinal section taken on the line 2—2 of Figure 1;

Figure 3 is a view in horizontal section taken on the line 3—3 of Figure 2;

Figure 4 is a view in vertical transverse section taken on the line 4—4 of Figure 1;

Figure 5 is a similar view taken on the line 5—5 of Figure 1;

Figure 6 is a fragmentary view in vertical longitudinal section taken on the same line as Figure 2, but drawn to a larger scale to better illustrate details of construction of the lids and the partition;

Figure 7 is a fragmentary view in vertical section of the water pail partly broken away and drawn to a larger scale.

Referring to the drawings by numerals, according to my invention, as illustrated, a bucket 1 is provided, of elongated, rectangular shape, preferably, and which embodies inner and outer spaced apart walls 2, 3 of any suitable thin metal with insulation 3' therebetween for preventing transfer of heat through said walls into said bucket.

A transverse partition 4 divides the interior of the bucket 1 centrally, from top to bottom thereof, into a minnow compartment 5 and an ice storage compartment 6.

A pair of rectangular carrying bails 7, 8 are provided for lifting and transporting the bucket 1 and which straddle the same with inturned ends 9, 10 journalled in the sides of said bucket substantially midway between the partition 4 and opposite ends of said bucket.

A canvas water pail 11 is provided to fit loosely in the minnow compartment 5 and which is preferably provided with a rigid rim member 12 in a rim hem 13 in said pail, the rim member 12 being provided with ears 14 in which the ends of a swingable bail 15 are pivoted.

A dished, thin metal, lid 16 is provided to fit in the top of the minnow compartment 5 and rest on the top edges of the bucket 1 and of the partition 4. A lid 17 for the ice storage compartment 6 is hinged, as at 18, to said lid 16 so that each lid 16, 17 may be opened separately. The lid 17 has a double walled, insulated, bottom 19 adapted to fit in the top of the ice storage compartment 6. A relatively smaller, perforated, service flap 20, of disk form, is hinged, as at 21, on top of the lid 16 with a finger-grip 22 thereon, and to cover a small central aperture 23 in said lid 16 for use in abstracting minnows from the water pail 11 without opening the lid 16 and the entire top of the minnow compartment 5. As shown in Figure 4, the flap 20 is adapted to fit in said aperture 23 tightly.

Returning now to the partition 4, said partition comprises spaced apart side walls 24, 25 of heat conductive metal in the minnow compartment 5 and the ice storage compartment 6, respectively, with insulation 26 interposed therebetween and horizontal heat conductive bars 27 extending in the insulation 26 between said side walls 24, 25 and connecting the same preferably adjacent the top and bottom of said partition. The side walls 24, 25 and the heat conductive bars 27 are formed preferably of copper which is a better conductor of heat than other metals.

Referring now to the use and operation of the described bucket, the canvas water pail 11 facilitates heat transfer from water, not shown, therein through the wall of the pail. The water containing pail 11 and the ice storage compartment 6 are designed to contain a given amount of water and ice, in fixed proportion, approximately. The heat conductive walls 24, 25 and the heat conductive bars 27 are designed to transfer heat from the minnow compartment 5 into the ice compartment 6 so as to lower the temperature of the water in the water pail 11 to approximately 50° F. in a given time and at a predetermined rate of transfer.

For example, with 12 lbs. of water in the water pail 11 and 12 lbs. of ice in the ice storage compartment 6, the heat conductive walls 24, 25 and the heat conductive plates 27 are designed to function so as to transfer heat from said compartment 5 into said compartment 6 at the rate of 4° F. per hour, to be absorbed by the ice, not shown, in said compartment 6 until the temperature of the water in the water pail 11 is lowered to substantially 50° F., at which time it may be maintained approximately at that temperature by replenishing ice in the ice storage compartment 6. This temperature, as before indicated, permits the water to absorb oxygen sufficient to maintain minnows alive in the same as long as the temperature is maintained. Thus, transfer of heat, at the predetermined rate specified, per hour, prevents the minnows from dying from sudden or too slow cooling of the water.

It is well-known that copper has a heat conductive capacity of 2,600 B. t. u., per hour, per square foot of one inch metal for each degree of temperature difference. Therefore, the rate of heat exchange which is effected in my improved bucket, of a given size for containing a given amount of water and ice, is determined by utilizing copper for a given size of heat conductive walls 24, 25 and heat conductive plates 27, of the requisite gauge to obtain the predetermined rate of heat exchange or transfer. In a bucket 1 with the water and ice capacity specified, and utilizing twenty-four gauge copper plate in the heat conductive side walls 24, 25 and plates 26, approximately 72 B. t. u. will be transferred in one hour with a temperature difference of 24° F. Approximately twelve pounds of water lowered 4° F. per hour requires removal of 48 B. t. u. The leakage around the lids 16, 17 and through the flap 20 will use up the remaining cooling capacity of the ice. When the temperature in the minnow compartment 5 has reached approximately 50° F., the transfer of heat from said compartment will equal approximately that lost by leakage of the cooling capacity of the ice in the ice storage compartment 6. Therefore, a temperature in the minnow compartment 5 of approximately 50° F. can be maintained as long as the fixed amount of ice is kept in the ice storage compartment 6.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention what is claimed as new is:

1. In a minnow bucket having insulated walls, and a central vertical partition dividing the same into a minnow compartment and an ice storage compartment, and a lid structure for closing the tops of said compartments, said partition comprising side walls of heat conductive metal with insulation therebetween, and horizontal heat conducting bars in said insulation connecting said side walls for transfer of heat from one side wall to the other.

2. In a minnow bucket having insulated walls, and a central vertical partition dividing the same into a minnow compartment and an ice storage compartment, and a lid structure for closing the tops of said compartments, said partition comprising side walls of heat conductive metal with insulation therebetween, and horizontal heat conducting bars in said insulation connecting said side walls for transfer of heat from one side wall to the other, said bars being of a gage and size predetermined in accordance with the size of said side walls to transfer from said minnow compartment to said ice storage compartment in a predetermined time, a predetermined number of B. t. u. starting with given high and low temperatures in said minnow and ice storage compartments respectively.

TEXAS A. MILHOLLAND.

REFERENCES CITED

The following references are of record in the file of this patent:

UNITED STATES PATENTS

| Number | Name | Date |
|---|---|---|
| 181,844 | Hitchcock | Sept. 5, 1876 |
| 1,817,545 | Copeman | Aug. 4, 1931 |
| 1,942,756 | Howard | Jan. 9, 1934 |